Feb. 17, 1970   D. W. ROCKWELL   3,496,526
SEISMIC CABLE DEPTH CONTROL SYSTEM
Filed Nov. 19, 1968   2 Sheets-Sheet 1
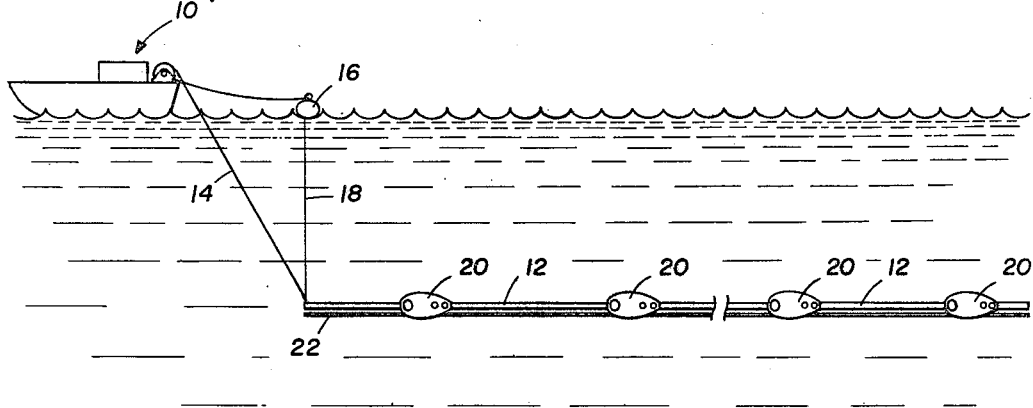
FIG. 1
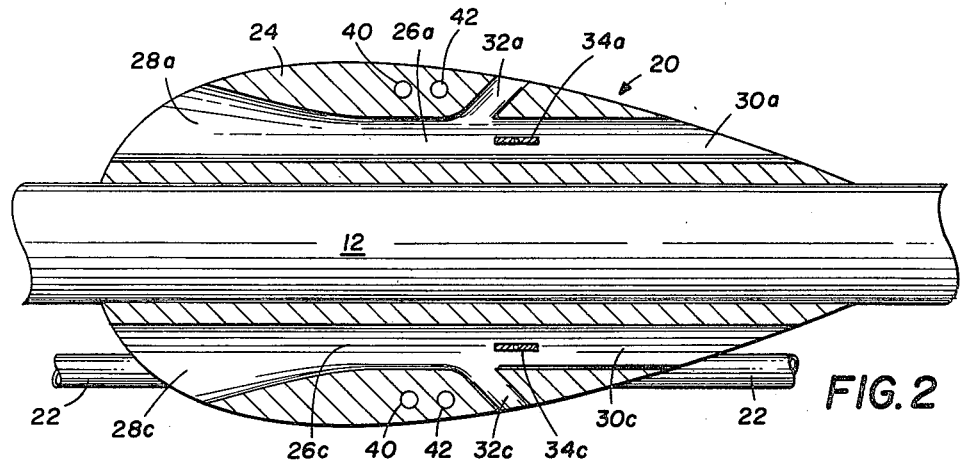
FIG. 2
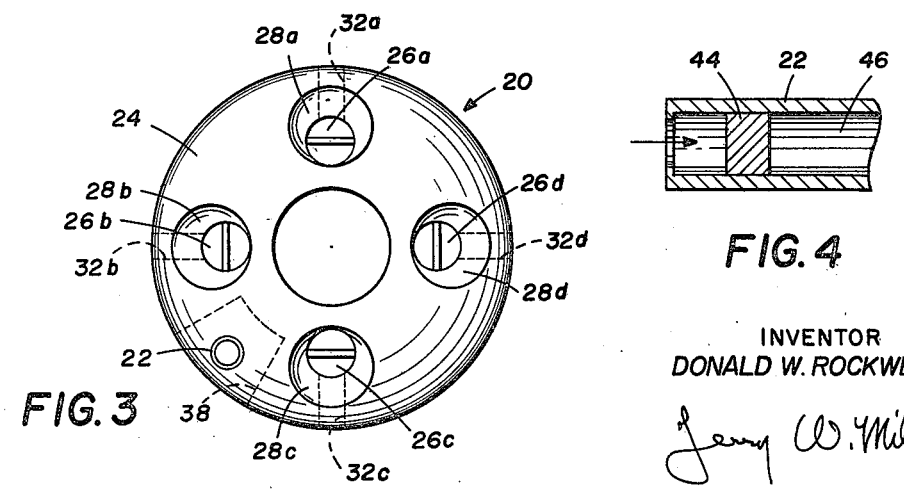
FIG. 3
FIG. 4
INVENTOR
DONALD W. ROCKWELL
ATTORNEY Feb. 17, 1970   D. W. ROCKWELL   3,496,526
SEISMIC CABLE DEPTH CONTROL SYSTEM
Filed Nov. 19, 1968   2 Sheets-Sheet 2

INVENTOR
DONALD W. ROCKWELL

Jerry W. Mills
ATTORNEY

United States Patent Office 3,496,526
Patented Feb. 17, 1970

3,496,526
SEISMIC CABLE DEPTH CONTROL SYSTEM
Donald W. Rockwell, Dallas, Tex., assignor to Gulf General Atomic Incorporated, San Diego, Calif., a corporation of Delaware
Filed Nov. 19, 1968, Ser. No. 777,039
Int. Cl. H04b 13/00
U.S. Cl. 340—7   19 Claims

ABSTRACT OF THE DISCLOSURE

A plurality of streamlined housings are rigidly connected at spaced points along a seismic cable being towed underwater. A number of symmetrically spaced passageways extend through each of the housings for normally admitting and exhausting water along paths parallel to the seismic cable. Sensing structure is provided in each housing to determine when the seismic cable varies from a predetermined depth, upon which water passing through a selected one of the passageways is diverted through a secondary outlet to provide a jet water stream of sufficient force and direction to return the seismic cable to the predetermined depth.

---

This invention relates to the towing of seismic cables in seismic exploration, and more particularly to the maintenance of a seismic cable at a predetermined depth while being towed through water.

It is common practice in marine seismic exploration to tow a seismic detector cable behind a vessel in order to receive reflections of seismic disturbances generated by the vessel. The quality of the data taken in such seismic exploration is directly related to the maintenance of the seismic detector cable at a predetermined depth underwater along the entire length of the cable. However, such seismic detector cables are often more than one mile in length, and thus problems arise in maintaining the entire cable at the predetermined depth due to variances of the salinity and temperature of the water.

A number of techniques have been heretofore developed in an effort to maintain seismic cables at a uniform depth underwater. Floats have been attached at spaced intervals along negatively buoyant cables in order that the floats will ride upon the surface of the water to support the cable at the predetermined depth. However, such floats have been found to generate a large amount of noise which tends to mask the received seismic data. Additionally, the floats experience vertical movement because of waves, thereby tending to induce oscillations along the length of the cable.

Systems have also been developed wherein gas filled flotation members are rigidly connected to points along the cable, with control structure provided for varying the flow of gas into and from the flotation members in order to vary the buoyance of the members. However, such systems are relatively complex and expensive to operate, and additionally often require ballasting in order to maintain the flotation members in upright positions. Further, the flotation members, in combination with the required ballasting, are generally relatively large in size and therefore create unwanted noise during the towing of the cable. The rigid attachment of the flotation members to the cable subject the flotation members to twisting motions of the cable, thereby exerting undue strain on the cable and also reducing the effectiveness of the depth control of the flotation members. An example of a depth control system utilizing gas-filled members is disclosed in U.S. Patent 3,332,058, entitled "Depth Control System for Marine Seismic Surveying," issued July 18, 1967 to G. B. Loper et al.

Paravanes have also been utilized in an effort to maintain seismic cables at predetermined depths. However, such paravanes have been found to create substantial noise while being towed underwater, and have generally been subject to twisting of the seismic cable which tends to reduce the effectiveness of the depth control of the paravane. In order to eliminate the rigid attachment of paravanes to a seismic detector cable, paravanes have been rotatably connected to the seismic cables.

Such rotatably connected paravanes have included passageways therethrough for receiving water, with the passageways including both an upwardly extending outlet and a downwardly extending outlet. A vane provided within the passageway is operable in order to selectively close off either of the outlets in order to vary the depth of the seismic cable due to force of the water stream issuing from the outlet. However, such paravanes have tended to create noise during the towing thereof due to the requirement of ballast which maintains the paravane in an upright position.

Additionally, the provision of bearings to allow rotation of the paravane about the seismic cable have tended to present wear and maintenance problems. Moreover, such paravane systems have generally measured the absolute pressure of water in order to determine changes in depths of the seismic cable. This absolute pressure is dependent upon such physical characteristics of the water as salinity and the like, and thus such absolute pressure measurement has resulted in inaccuracies in the maintained depth of seismic cable. An example of a paravane system for controlling the depth of a seismic cable is disclosed in U.S. Patent No. 3,375,800, entitled "Seismic Cable Depth Control Apparatus," issued Apr. 2, 1968, to J. R. Cole et al.

In accordance with the present invention, a streamlined housing is rigidly attached about a seismic cable and includes structure for selectively directing streams of water therefrom having sufficient force and direction to maintain the seismic cable at a predetermined depth.

In another aspect of the invention, a depth control member is rigidly attached about a seismic cable in a symmetrical manner. Structure is provided to sense the orientation of the member. Depth sensing structure is responsive to the sensed orientation of the member for selectively directing streams of water from the member in order to maintain the cable at a predetermined depth.

In a more specific aspect of the invention, a plurality of passageways are symmetrically disposed through a streamlined housing rigidly connected about a portion of a seismic cable. Each of the passageways extends generally parallel to the seismic cable and includes an inlet for admitting water and an outlet for exhausting water therefrom. A secondary outlet extends rearwardly at an angle from each passageway, and structure is provided to slectively exhaust hte water from either the outlet or secondary outlet of each of the passageways.

For a more complete understanding of the present invention and for further objects and advantages thereof, reference is now made to the following description taken in conjunction with the accompanying drawings, in which:

FIGURE 1 is a diagrammatic illustration of an underwater seismic exploration system utilizing the present depth controllers;

FIGURE 2 is a sectional view of one of the depth controllers of the invention;

FIGURE 3 is an end view of the depth controller shown in FIGURE 2;

FIGURE 4 is a sectional view of a portion of the pressure sensing system utilized by the depth controllers;

Figure 5:
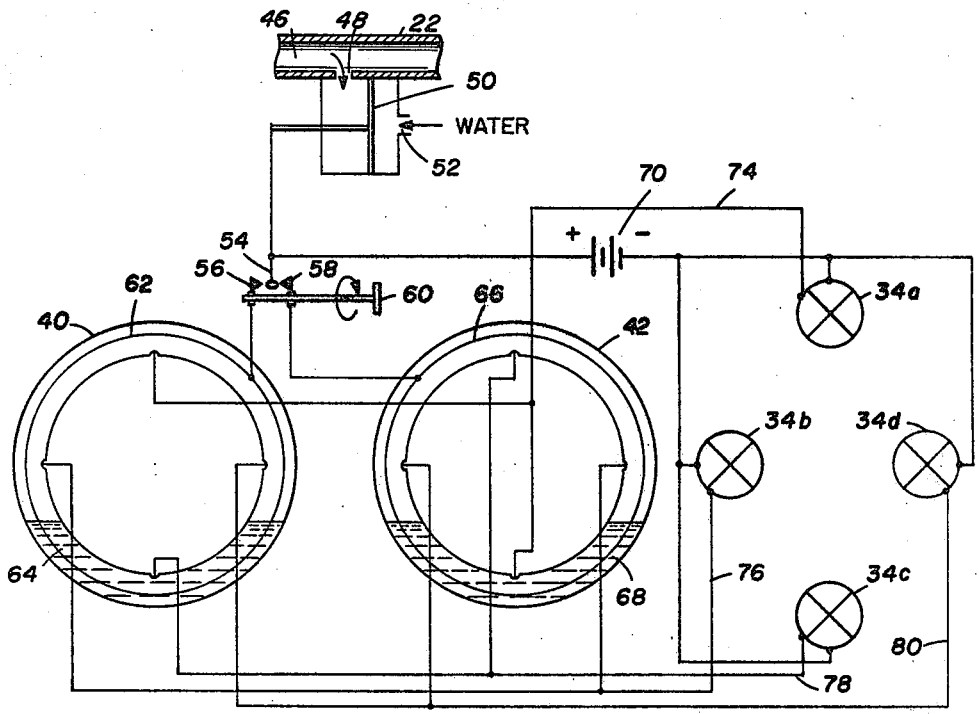
FIGURE 5 is a schematic diagram of an electrical control system for use with the present depth controllers.

Referring now to the figures, FIGURE 1 illustrates a seismic vessel designated generally by the numeral 10 towing a conventional seismic detector cable or streamer 12 by a tow line 14. Vessel 10 also tows a float member 16 which is connected via a cable 18 to the leading end of the seismic streamer 12 so that the end of the streamer 12 is maintained at a predetermined depth. If desired, a boom may alternatively be utilized to hold the weighted leading end of the streamer 12 at the predetermined depth. As is well-known, streamer 12 includes a plurality of geophones or hydrophones which receive seismic reflections from seismic disturbances generated by the vessel 10, or by other adjacent vessels.

A plurality of depth control members 20 are connected at spaced intervals along the length of the streamer 12 in order to maintain the entire length of the streamer 12 at or near the predetermined depth of the leading end of the streamer 12. As will be subsequently described in greater detail, each of the depth control members 20 emit jet streams of water in order to exert upward or downward forces on the seismic streamer to maintain the predetermined depth. A non-compressible tube 22 extends substantially along the length of the streamer 12 and passes through each of the depth control members 20 in order to provide indications of the water pressure at the leading end of the streamer 12. Alternatively, a pressure sensitive transducer may be attached to the leading end of the streamer 12 to provide electrical indications of the predetermined depth to each of the depth control members 20.

FIGURES 2 and 3 illustrate one embodiment of a depth control member 20 which comprises a streamlined housing 24 rigidly connected about the streamer 12 by frictional fit or by suitable keying. The seismic streamer 12 is preferably slightly buoyant in average sea water. The housing 24 is not required to be buoyant, and may comprise any suitable material sufficiently resistant to the effects of salt water. The streamlined shape of the depth control member 20 substantially reduces the generation of noise during towing through water. A plurality of passageways 26a–d extend through the housing 24, with the passageways including outwardly flared inlet portions 28a–d. Each of the passageways includes an outlet portion 30a–d extending generally parallel to the seismic cable 12.

In normal operation of the depth control member 20, water is admitted through each of the inlets 28a–d and is exhausted from the outlets 30a–d. The flow of water through the depth control member 20 is substantially unimpeded, and therefore little drag is exerted upon the seismic cable 12 by the depth control member 20. In some instances, it may be desirable to place a screen over the inlets 28a–d to prevent obstruction of the passageways by plant life or the like. Due to the enlarged openings of the inlets 28a–d, the velocity of the water exhausted through the outlets 30a–d is relatively high.

Secondary outlets 32a–d extend from the passageways 26a–d radially outwardly at an angle to the seismic cable 12. Solenoid-operated, spring-loaded valves 34a–d are disposed in each of the passageways 26a–d slightly rearwardly from the secondary outlets 32a–d. Valves 34a–d are normally maintained in the illustrated open position, thus allowing free flow of water through the outlets 30a–d. However, upon actuation of the valves 34a–d, the valves close to divert at least a portion of the water outwardly through the secondary outlets 32a–d. According to the invention, only one of the valves 34a–d is selectively actuated at one time in order to provide a jet stream of water having a vertical component of force from one of the secondary outlets 32a–d. A correcting force is thus exerted upon the depth control member 20 to maintain the seismic cable 12 at the predetermined depth.

While only four passageways through the depth control member 20 have been illustrated in FIGURES 2–5 for simplicity of illustration, it will be understood that it is generally desirable to provide at least eight or more passageways in order to provide continuous and accurate depth regulation. The depth sensing and control system includes the hollow tube 22 which passes through each of the depth control members 20. A water-tight compartment illustrated generally by the dotted line 38 contains pressure sensing structure and control circuitry for selectively energizing one of the valves 34a–d. As shown in FIGURE 2, a pair of radial mercury switches 40 and 42 extend around the housing 24 for sensing of the orientation of the depth control member 20.

FIGURE 4 illustrates the leading end of the tube 22. The end of the tube 22 is open, with a free sliding piston member 44 disposed therein. The rearward end of the tube 22 is closed. A suitable fluid 46, which may for instance be oil, is disposed between the piston member 44 and the closed end of the tube 22. The pressure of the water at the leading edge of the tube 22 acts against the piston member 44, thereby exerting an equal pressure upon the fluid 46. An indication of the water pressure at the leading end of the streamer 12 is thus provided throughout the length of the tube 22. As shown in FIGURE 5, apertures 48 are defined in the tube 22 within each of the depth control members 20. The pressure of the fluid 46 acts upon a piston member or diaphragm 50.

An opposing force is exerted upon the piston member 50 by the pressure of water entering a conduit 52 which is open to the water adjacent the depth control member 20. Thus, an indication of the difference between the water pressure at the leading end of the streamer 12 and the water pressure at each depth controller 20 is provided by the position of the piston member 50.

Movement of the piston member 50 moves an electrical contact 54 between two fixed contacts 56 and 58. A threaded rod 60 may be rotated to vary the distance between the contacts 56 and 58 to allow selective adjustment of the response characteristics of the depth control device. Contact 56 is directly connected to an uninsulated conductive ring 62 which is centered within the annular mercury switch 40. A quantity of mercury 64 is contained within the annular mercury switch 40, the position of the mercury 64 being dependent upon the orientation of the depth control member 20.

Contact 58 is directly connected to an uninsulated conductive ring 66 which is centered within the annular mercury switch 42. A quantity of mercury 68 is disposed within the annular mercury switch 42. A battery 70 is connected at its positive terminal to the movable contact 54 and at its negative terminal to one terminal of each of the solenoids controlling valves 34a–d. The solenoids, when energized, close the valves 34a–d through suitable linkages. It will be understood that valves 34a–d may comprise suitable valving structure other than the butterfly valve type structure illustrated, such as a hinged flap or the like.

A second terminal of the solenoid controlling valve 34a is connected via lead 74 to the lower portion of the annular mercury switch 42 and to the upper portion of the annular mercury switch 40. The end of lead 74 extends into each of the annular mercury switches in order to make electrical contact with the mercury contained therein. The second terminal of the solenoid controlling valve 34b is connected via lead 76 to a side portion of the annular mercury switch 40 and additionally to a side portion of the annular mercury switch 42. The second terminal of the solenoid controlling valve 34c is connected via a lead 78 to the upper portion of the annular mercury switch 42 and to the lower portion of the annular mercury switch 40. The second terminal of the solenoid controlling valve 34d is connected via lead 80 to side portions of both of the annular mercury switches 40 and 42.

In operation of a depth control member 20, the annular mercury switches 40 and 42 continuously sense the orientation of the depth control member with respect to vertical. Variances in the water pressure adjacent the depth control member 20 is sensed by the piston member 50. When the portion of the seismic cable 12 attached to the depth control member 20 sinks below the leading end of the seismic cable 12, the pressure exerted by the water surrounding the depth control device will be greater than the pressure exerted by the fluid 46 within the tube 22. Thus, the piston member 50 will be moved into contact with contact 56. This completes the circuit between the positive terminals of the battery 70 through the conductive ring 62, the conductive quantity of mercury 64, and the lead 78 to the valve 34c.

The energization of the valve 34c thus diverts water through the secondary outlet 32c to exert an upward pressure upon the seismic cable 12. When the cable 12 rises to the predetermined depth, the pressure of the water will equal the pressure exerted by the oil 46 within the tube 22, and therefore the contact 54 will be moved away from contact 56, opening valve 34c and eliminating the upward thrust imparted to the seismic cable 12.

Similarly, when the seismic cable 12 rises to a depth above the predetermined depth, the pressure exerted by the oil 46 within the tube 22 is greater than the pressure exerted by the water adjacent the depth controller 20, and therefore the contact 54 is moved against contact 58. The positive terminal of the battery 70 is thus connected across the valve 34a via the conductive ring 66, the quantity of mercury 68, and lead 74. Valve 34a is actuated to divert water through the secondary outlet 32a to force the seismic cable 12 down to the predetermined depth. When the cable 12 twists, the mercury 64 and 68 will move within the annular mercury switches in order to indicate which of the valves are in upper and lower positions in order that corrective forces may be properly applied when the seismic cable again varies from the predetermined depth.

It will be understood that other types of sensing mechanisms may be used to sense the orientation of the depth control member 20, such as conductive ball loosely disposed within a chamber having a plurality of conductive points therein. Additionally, various types of pressure sensing devices may be alternatively utilized to choose whether to energize an upper or lower valve in order to apply the proper vertical corrective forces to the cable. For instance, a pressure sensor disposed in the leading end of the streamer 12 may transmit control signals to the depth control members 20 by multiplexing circuitry extending through the cable or by high frequency sound through the water.

Battery 70 may be disposed within the depth control members, or if desired, electrical leads may be run from the seismic vessel 10 to each of the depth control members 20 to supply the desired power. In some instances, it may be desired to provide an electrical generator within the depth control members 20, with a vane member rotated by the passage of water through the depth control members powering the generator.

Figure 6:
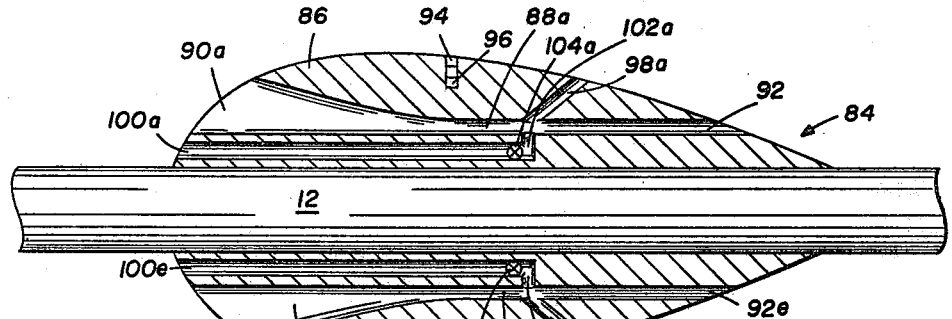
FIGURE 6 is a sectional view of another embodiment of a depth controller according to the invention.
Figure 7:
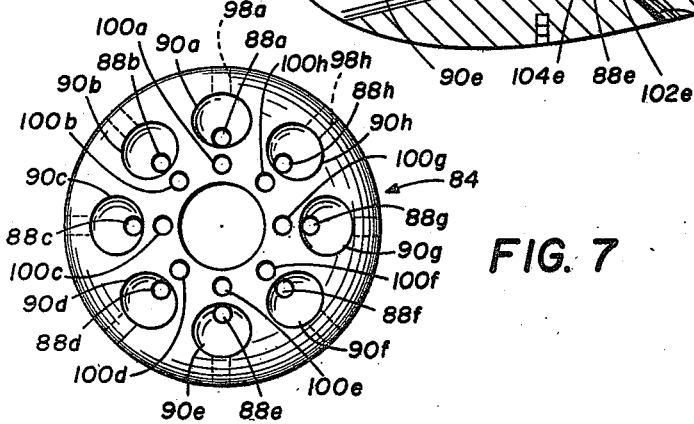
FIGURE 7 is an end view of the depth controller shown in FIGURE 6.

FIGURES 6 and 7 illustrate a second embodiment of the depth controller designated generally by the numeral 84. The housing 86 of member 84 is provided with a streamlined shape and is rigidly attached about the seismic streamer 12. Eight annular passageways 88a–h are disposed through the housing 86 generally parallel to the cable 12. Inlet portions 90a–h are flared outwardly in order to provide a relatively high velocity stream of water through the passageways. Normally, the water is exhausted outwardly through outlets 92a–h and no vertical forces are applied to the seismic cable 12. Annular mercury switches 94 and 96 are disposed within the body 86 in order to sense the orientation of the depth controller in the manner previously described.

Secondary outlets 98a–h extend from the passageways radially outwardly at an angle to the seismic cable 12. Eight bores 100a–h are defined through the body 86 and include 90° bends forming control jets 102a–h which communicate with the passageways in the region of the openings to the secondary outlets 98a–h. Selectively operable valves 104a–h are disposed in the bores 100a–h.

In operation, valves 104a–h are normally closed and therefore streams of water are admitted by the inlets 90a–h and are exhausted through the outlets 92a–h. No corrective forces are then transmitted to the seismic cable. When a variance from the predetermined depth is sensed by the circuitry previously described, a selected one of the valves 104a–h is de-energized to provide a flow of water through one of the bores 100a–h and through the respective control jet 102a–h. The resulting jet of water from the control jet impinges substantially at a right angle to the stream of water passing through the passageway, thereby diverting a substantial portion of the water outwardly through the respective secondary outlet 98a–h. The resulting stream of water from the secondary outlet exerts a corrective vertical force to the seismic cable 12, thereby maintaining the predetermined depth.

The size of the depth control members and the number of such members required for depth control of a particular seismic streamer will be dependent upon the size and length of the seismic streamer. However, it is believed that good seismic cable depth control may be provided by a spacing of 200 meters between depth control members along a 2½ inch diameter seismic cable, with each member providing approximately 15 pounds of restoring force to the seismic cable. The control exerted by the present invention provides a relatively low but continuous restoring force to the cable, thereby preventing over-reaction to change of depth of the streamer and eliminating oscillation of the streamer. The present control members allow the seismic streamer to twist without restriction, and yet accurate restoring forces are provided due to the orientation sensing capability of the members. The fact that the control members fit symmetrically around the seismic cable and have a streamlined shape, without requiring ballasting or protruding paravanes, eliminates the introduction of substantial drag to the seismic streamer.

Whereas specific embodiments of the invention have been described in detail, it will be understood that various changes and modifications will be suggested to one skilled in the art, and it is intended to encompass these changes and modifications as fall within the scope of the appended claims.

What is claimed is:

1. Apparatus for maintaining a cable at a predetermined position while being towed through a fluid comprising:
   (a) a housing having fluid streams passing therethrough rigidly attachable to said cable, and
   (b) means for selectively directing said streams of fluid from said housing of sufficient force and direction to maintain said cable at the predetermined position.

2. The apparatus of claim 1 and further comprising: means within said housing for sensing variance of said cable from said predetermined position and for selecting the direction of a stream of fluid to correct the variance.

3. The apparatus of claim 2 and further comprising: means within said housing for sensing the physical orientation of said housing with respect to vertical.

4. The apparatus of claim 1 and comprising: means for diverting fluid streams normally passing generally horizontally through said housing to fluid streams having a vertical component for exerting vertical forces on said housing to maintain said cable at the predetermined position.

5. The apparatus of claim 1 and further comprising: means for sensing variations in the fluid pressure upon said housing for controlling the directing of said streams of fluid.

6. Apparatus for maintaining a seismic cable at a predetermined depth while the cable is being towed underwater comprising:
 (a) a streamlined housing rigidly connected about a portion of the cable,
 (b) a plurality of symmetrically spaced passageways extending through said housing generally parallel to said cable, each passageway having an inlet for admitting water and an outlet for exhausting water,
 (c) a secondary outlet extending rearwardly at an angle from each passageway, and
 (d) means selectively operable for diverting water through said secondary outlets.

7. The apparatus of claim 6 wherein said inlets have diameters substantially larger than said outlets.

8. The apparatus of claim 6 and further comprising:
 means for sensing the orientation of said housing to provide indications of which of said passageways are disposed adjacent a vertical reference.

9. The apparatus of claim 8 and further comprising:
 means for sensing the depth of said cable and for diverting water through a selected one of said passageways disposed adjacent the vertical reference to maintain said cable at the predetermined depth.

10. The apparatus of claim 6 wherein said means comprises:
 mechanical valves for selectively blocking said outlets to divert water through said secondary outlets.

11. The apparatus of claim 6 wherein said means comprises:
 water jets selectively operable to impinge against the flow of water within said passageways to divert the water through said secondary outlets.

12. The apparatus of claim 11 wherein said water jets comprise:
 bores extending through said housing for receiving water and for directing jets of water against the flow of water within said passageways, and
 valve means disposed within said bores for controlling the flow of water therethrough.

13. The apparatus of claim 6 and further comprising:
 means for sensing variances in water pressure from a preselected pressure for controlling the diverting of water through said secondary outlets.

14. The apparatus of claim 13 and further comprising:
 a closed end tube extending from a reference point at the predetermined depth to said housing, said tube containing fluid maintained at a pressure equal to the water pressure at said reference point, and
 means for sensing differences in the water pressure upon said housing and the pressure at said reference point.

15. The apparatus of claim 6 wherein at least eight passageways are symmetrically disposed through said housing.

16. The apparatus of claim 6 and further comprising:
 a plurality of said housings spaced along the length of said cable.

17. The method of maintaining a seismic cable at a predetermined depth comprising:
 (a) passing a plurality of water streams symmetrically about said cable through a housing along paths generally parallel to said cable,
 (b) sensing variance of the cable position from a preselected depth, and
 (c) diverting one of said water streams to exert a corrective vertical force on said cable to move said cable to said preselected depth.

18. The method of claim 17 and further comprising:
 (a) sensing the orientation of said water streams with respect to a vertical reference,
 (b) sensing the direction of variance of the cable position along said vertical reference, and
 (c) diverting one of said water streams in response to the sensed orientation to exert a force opposite said direction of variance.

19. The method of claim 17 and further comprising:
 comparing the water pressure adjacent a portion of said seismic cable with a preselected reference pressure, and
 diverting one of said water streams in an upward direction when said water pressure is greater than said reference pressure and in a downward direction when said water pressure is less than said reference pressure.

References Cited
UNITED STATES PATENTS

| | | | |
|---|---|---|---|
| 3,273,825 | 9/1966 | Kerner | 244—3.22 |
| 3,332,058 | 7/1967 | Loper et al. | 340—7 |
| 3,375,800 | 4/1968 | Cole et al. | 340—7 |

RODNEY D. BENNETT, Jr., Primary Examiner

DANIEL C. KAUFMAN, Assistant Examiner

U.S. Cl. X.R.

114—23, 24, 25, 235; 137—81.5

UNITED STATES PATENT OFFICE
CERTIFICATE OF CORRECTION

Patent No. 3,496,526                          February 17, 1970

Donald W. Rockwell

It is certified that error appears in the above identified patent and that said Letters Patent are hereby corrected as shown below:

In the heading to the printed specification, lines 3 to 5, "assignor to Gulf General Atomic Incorporated, San Diego, Calif., a corporation of Delaware" should read -- assignor to Texas Instruments Incorporated, Dallas, Tex., a corporation of Delaware --.

Signed and sealed this 1st day of December 1970.

(SEAL)

Attest:

Edward M. Fletcher, Jr.

Attesting Officer

WILLIAM E. SCHUYLER, JR.
                                                              Commissioner of Patents